United States Patent [19]
Thomas

[11] Patent Number: 6,070,277
[45] Date of Patent: Jun. 6, 2000

[54] WASTE RECEPTACLE BAG

[76] Inventor: Cynthia S. Thomas, 130 N. U St., Salt Lake City, Utah 84103

[21] Appl. No.: 09/234,699

[22] Filed: Jan. 21, 1999

[51] Int. Cl.[7] .................................................. A47K 11/06
[52] U.S. Cl. .................................. 4/484; 4/144.1; 4/144.2
[58] Field of Search .............................. 4/484, 483, 479, 4/144.2, 144.1, 144.4; 141/114, 314, 313

[56] References Cited

U.S. PATENT DOCUMENTS

| | | | |
|---|---|---|---|
| 3,095,578 | 7/1963 | Stanford | 4/144.2 |
| 3,952,336 | 4/1976 | Kunter et al. | 4/142 |
| 4,665,571 | 5/1987 | Muccione | 4/144.1 |
| 4,996,727 | 3/1991 | Wyatt | 4/484 |
| 5,155,871 | 10/1992 | Sams | 4/484 |
| 5,342,332 | 8/1994 | Wheeler | 604/349 |
| 5,732,418 | 3/1998 | Sekitou | 4/449 |

*Primary Examiner*—Steven O. Douglas
*Assistant Examiner*—Huyen Le

[57] ABSTRACT

A new waste receptacle bag for receiving urine, fecal matter, and vomit for later disposal. The inventive device includes a bag portion with a closed bottom, an open top, and a peripheral sidewall extending between the top and bottom of the bag portion. An annular rim portion extends along the open top of the bag portion.

13 Claims, 2 Drawing Sheets

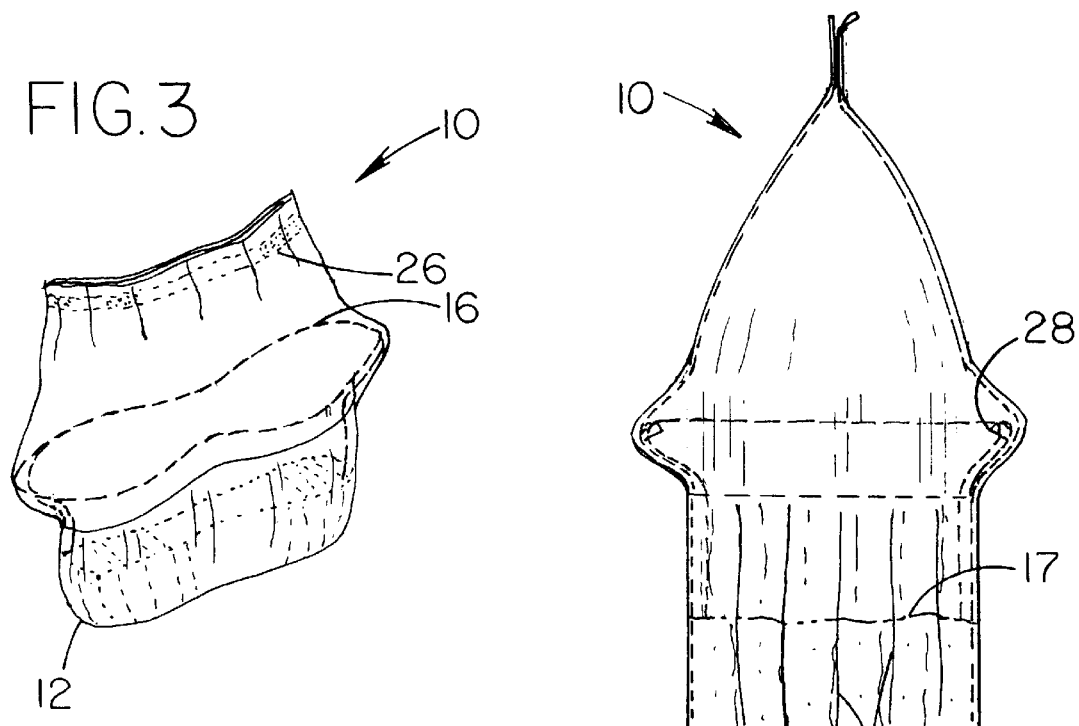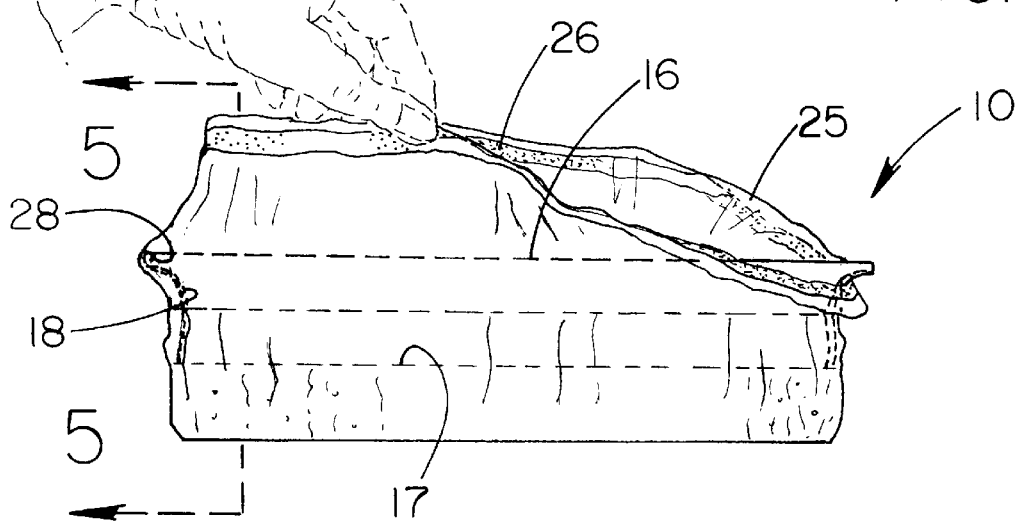

WASTE RECEPTACLE BAG

BACKGROUND OF THE INVENTION

1. Field of the Invention

The present invention relates to portable commodes and more particularly pertains to a new waste receptacle bag for receiving urine and fecal matter for later disposal.

2. Description of the Prior Art

The use of portable commodes is known in the prior art. More specifically, portable commodes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,040,249; U.S. Pat. No. 2,912,702; U.S. Pat. No. 5,155,871; U.S. Pat. No. 5,048,130; U.S. Pat. No. Des. 262,051; and U.S. Pat. No. 3,159,848.

While these devices fulfill their respective, particular objectives and requirements, the aforementioned patents do not disclose a new waste receptacle bag. The inventive device includes a bag portion with a closed bottom, an open top, and a peripheral sidewall extending between the top and bottom of the bag portion. An annular rim portion extends along the open top of the bag portion.

In these respects, the waste receptacle bag according to the present invention substantially departs from the conventional concepts and designs of the prior art, and in so doing provides an apparatus primarily developed for the purpose of receiving urine and fecal matter for later disposal.

SUMMARY OF THE INVENTION

In view of the foregoing disadvantages inherent in the known types of portable commodes now present in the prior art, the present invention provides a new waste receptacle bag construction wherein the same can be utilized for receiving urine and fecal matter for later disposal.

The general purpose of the present invention, which will be described subsequently in greater detail, is to provide a new waste receptacle bag apparatus and method which has many of the advantages of the portable commodes mentioned heretofore and many novel features that result in a new waste receptacle bag which is not anticipated, rendered obvious, suggested, or even implied by any of the prior art portable commodes, either alone or in any combination thereof.

To attain this, the present invention generally comprises a bag portion with a closed bottom, an open top, and a peripheral sidewall extending between the top and bottom of the bag portion. An annular rim portion extends along the open top of the bag portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new waste receptacle bag apparatus and method which has many of the advantages of the portable commodes mentioned heretofore and many novel features that result in a new waste receptacle bag which is not anticipated, rendered obvious, suggested, or even implied by any of the prior art portable commodes, either alone or in any combination thereof.

It is another object of the present invention to provide a new waste receptacle bag which may be easily and efficiently manufactured and marketed.

It is a further object of the present invention to provide a new waste receptacle bag which is of a durable and reliable construction.

An even further object of the present invention is to provide a new waste receptacle bag which is susceptible of a low cost of manufacture with regard to both materials and labor, and which accordingly is then susceptible of low prices of sale to the consuming public, thereby making such waste receptacle bag economically available to the buying public.

Still yet another object of the present invention is to provide a new waste receptacle bag which provides in the apparatuses and methods of the prior art some of the advantages thereof, while simultaneously overcoming some of the disadvantages normally associated therewith.

Still another object of the present invention is to provide a new waste receptacle bag for receiving urine and fecal matter for later disposal.

Yet another object of the present invention is to provide a new waste receptacle bag which includes a bag portion with a closed bottom, an open top, and a peripheral sidewall extending between the top and bottom of the bag portion. An annular rim portion extends along the open top of the bag portion.

Still yet another object of the present invention is to provide a new waste receptacle bag that is particularly useful when there is no bathroom or when the facilities are too filthy for the tastes of the user.

Even still another object of the present invention is to provide a new waste receptacle bag that may be used by ill, injured, or convalescent people who have difficulty sitting on a toilet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic side view of the present invention illustrating how to seal the open top of the bag shut.

FIG. 3 is a schematic side view of the present invention illustrating the bag with the open top sealed shut.

FIG. 4 is a schematic side view of the present invention illustrating the bag with the open top sealed shut.

DESCRIPTION OF THE PREFERRED EMBODIMENT

Figure 1:
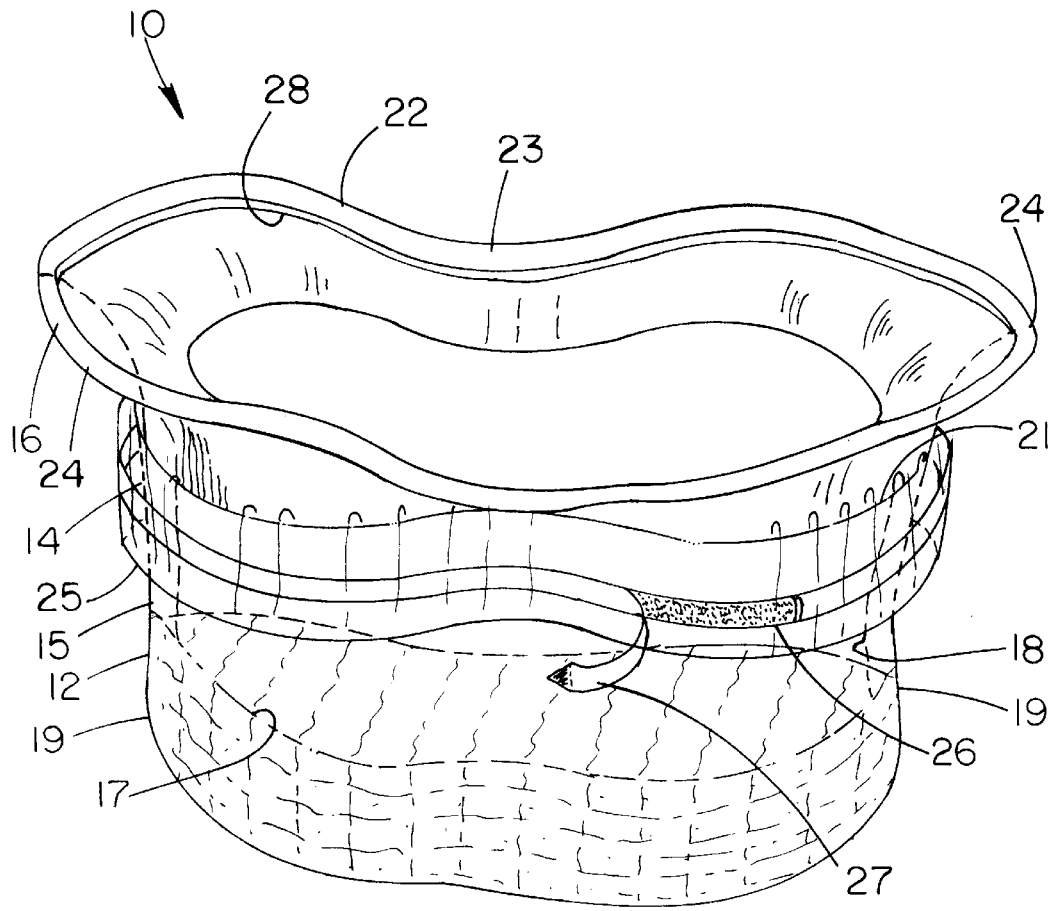
FIG. 1 is a schematic perspective view of a new waste receptacle bag according to the present invention.
Figure 5:
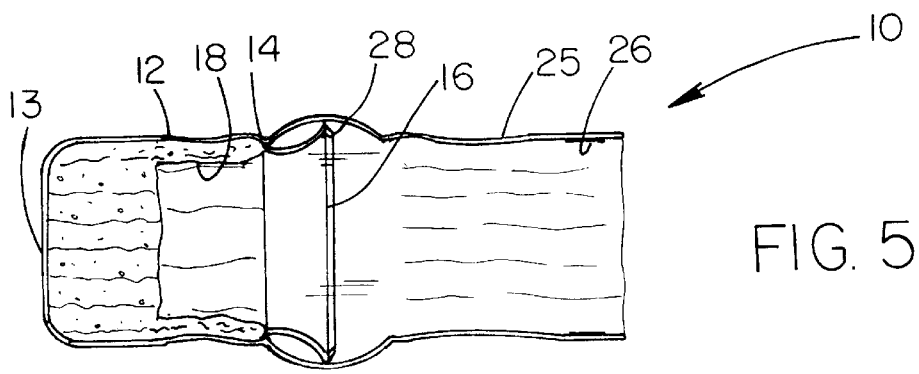
FIG. 5 is a schematic cross-sectional view of the present invention taken from line 5—5 of FIG. 2.

With reference now to the drawings, and in particular to FIGS. 1 through 5 thereof, a new waste receptacle bag embodying the principles and concepts of the present invention and generally designated by the reference numeral 10 will be described.

As best illustrated in FIGS. 1 through 5, the waste receptacle bag 10 comprises a bag portion 12 with a closed bottom 13, an open top 14, and a peripheral sidewall 15 extending between the top and bottom of the bag portion. An annular rim portion 16 extends along the open top of the bag portion.

Preferably, a first layer of absorptive material 17 is disposed in the bag portion and positioned towards the bottom of the bag portion. The first layer of absorptive material is for absorbing urine or vomit. More preferably, an annular second layer of absorptive material 18 extends upwardly from the first layer of absorptive material. The second layer of absorptive material extends around the peripheral sidewall of the bag portion.

Ideally, each of the layers of absorptive materials has a gelling substance therein that reacts with urine or vomit to form a gel so that the urine or vomit is less likely to spill out of the bag portion in case the top is not sealed completely. An exemplary gelling substance is CAPTURE SUPER ABSORBENT POWDER manufactured and marketed by VST Chemical Corporation, 248 W. Park Ave. Suite 353, Long Beach, N.Y. 11561 (800) 241–7428. The CAPTURE SUPER ABSORBENT POWDER turns urine and vomit into a thickened gel. Also ideally, the layers of absorptive materials comprise cotton because of cotton's light weight, compressibility, and high absorptive qualities.

Preferably, lateral sides 19 of the bag portion each have a plurality of pleats 20 extending between the top and bottom of the bag portion. The pleats help permit compact folding of the bag portion for more convenient transportation and storage.

An annular generally elliptical shaped rim portion extends along the open top of the bag portion. Preferably, the rim portion curves outwardly from a lower edge 21 to an upper edge 22 thereof. Also preferably, the rim portion is cupped for accommodating genital and anal areas of a user. The rim portion curves upwardly relative to the bottom of the bag portion from central portions 23 of the rim portion towards lateral portions 24 of the rim portion.

A width of the rim portion is defined between its upper and lower edges. Preferably, the width of the rim portion at the lateral portions is greater than the width of the rim portion at the central portions.

Preferably, a sealing flap 25 extends from an outer side of the rim portion or from the open top of the bag portion adjacent the lower edge of the rim portion. Ideally, the sealing flap has an annular adhesive strip 26 extending around its inner surface. The adhesive strip is for closing the sealing flap such that a watertight seal is formed so that fecal matter and urine are not spilled out of the bag when transporting the bag after use.

Most ideally, the adhesive strip comprising a pressure sealant material of a type known in the art that forms a seal when pressed against a surface.

A protective strip 27 covers the adhesive strip. The protective strip is removable to expose the adhesive strip.

Also preferably, the rim portion has a peripheral lip 28 extending inwardly around an inner surface thereof and positioned towards the upper edge thereof. The peripheral lip helps prevent urine striking the rim portion from splattering and running over the upper edge of the rim portion.

The preferred dimensions for the rim portion are between about 6 and 12 inches between the lateral portions, and between about 4 and 9 inches between the central portions. In a larger capacity embodiment, the bag portion could hold up to 2000 cc of waste.

In use, a user unfolds the bag and places the rim portion against his or her urogenital and perineal area to urinate and defecate. Once done, the protective strip is removed from the adhesive strip and the sealing flap is folded up over the rim portion, as shown in FIG. 2. The adhesive strip is squeezed together to seal the sealing flap together, thereby trapping the contents of the bag portion.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A waste receptacle bag for receiving urine and feces, comprising:

a bag portion having a closed bottom, an open top, and a peripheral sidewall extending between said top and bottom of said bag portion;

an annular rim portion extending along said open top of said bag portion;

a first layer of absorptive material being disposed in said bag portion and positioned towards said bottom of said bag portion; and an annular second layer of absorptive material extending upwardly from said first layer of absorptive material, said second layer of absorptive material extending around said peripheral sidewall of said bag portion.

2. The waste receptacle bag of claim 1, wherein said first layer of absorptive materials has a gelling substance therein, said gelling substance reacting with body fluids to form a gel.

3. The waste receptacle bag of claim 1, wherein said first layer of absorptive material comprises cotton.

4. The waste receptacle bag of claim 1, wherein lateral sides of said bag portion each have a plurality of pleats extending between said top and bottom of said bag portion, said pleats being for helping permit compact folding of said bag portion.

5. The waste receptacle bag of claim 1, wherein said rim portion curves outwardly from a lower edge to an upper edge thereof.

6. The waste receptacle bag of claim 1, wherein said rim portion is cupped for accommodating genital and anal areas of a user, said rim portion curving upwardly relative to said bottom of said bag portion from central portions of said rim portion towards lateral portions of said rim portion.

7. The waste receptacle bag of claim 1, wherein a width of said rim portion is defined between said upper and lower edges thereof, said width of said rim portion at said lateral portions being greater than said width of said rim portion at said central portions.

8. The waste receptacle bag of claim 1, further comprising a sealing flap extending from an outer side of said rim portion.

9. The waste receptacle bag of claim 8, wherein said sealing flap has an adhesive strip extending around an inner surface thereof, said adhesive strip being for closing said sealing flap.

10. The waste receptacle bag of claim 9, wherein said adhesive strip comprises a pressure sealant material.

11. The waste receptacle bag of claim 9, wherein a protective strip covers said adhesive strip, said protective strip being removable for exposing said adhesive strip.

12. The waste receptacle bag of claim 1, wherein said rim portion has a peripheral lip extending inwardly around an inner surface thereof and positioned towards said upper edge thereof, said peripheral lip being for helping prevent urine striking said rim portion from splattering and running over said upper edge of said rim portion.

13. A waste receptacle bag for receiving urine and feces, comprising:

a bag portion having a closed bottom, an open top, and a peripheral sidewall extending between said top and bottom of said bag portion;

a first layer of absorptive material being disposed in said bag portion and positioned towards said bottom of said bag portion, said first layer of absorptive material being for absorbing urine;

an annular second layer of absorptive material extending upwardly from said first layer of absorptive material, said second layer of absorptive material extending around said peripheral sidewall of said bag portion;

each of said layers of absorptive materials having a gelling substance therein, said gelling substance reacting with urine to form a gel;

wherein said layers of absorptive materials comprise cotton;

lateral sides of said bag portion each having a plurality of pleats extending between said top and bottom of said bag portion, said pleats being for helping permit compact folding of said bag portion;

an annular rim portion extending along said open top of said bag portion;

said rim portion curving outwardly from a lower edge to an upper edge thereof;

said rim portion being cupped for accommodating genital and anal areas of a user, said rim portion curving upwardly relative to said bottom of said bag portion from central portions of said rim portion towards lateral portions of said rim portion;

a width of said rim portion being defined between said upper and lower edges thereof, wherein said width of said rim portion at said lateral portions is greater than said width of said rim portion at said central portions;

a sealing flap extending from an outer side of said rim portion;

said sealing flap having an annular adhesive strip extending around an inner surface thereof, said adhesive strip being for closing said sealing flap;

said adhesive strip comprising a pressure sealant material;

a protective strip covering said adhesive strip, said protective strip being removable for exposing said adhesive strip; and said rim portion having a peripheral lip extending inwardly around an inner surface thereof and positioned towards said upper edge thereof, said peripheral lip being for helping prevent urine striking said rim portion from splattering and running over said upper edge of said rim portion.

* * * * *